(12) United States Patent
Szeremeta et al.

(10) Patent No.: US 9,573,306 B2
(45) Date of Patent: Feb. 21, 2017

(54) INJECTION MOLDING PART WITH "ZERO DRAFT" DESIGN AND MANUFACTURING METHODOLOGIES

(71) Applicant: Western Digital Technologies, Inc., Irvine, CA (US)

(72) Inventors: Wojciech Szeremeta, Mission Viejo, CA (US); Robert G. Fairchild, Tustin, CA (US); Brian S. Nihei, Fountain Valley, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 33 days.

(21) Appl. No.: 14/246,750

(22) Filed: Apr. 7, 2014

(65) Prior Publication Data

US 2015/0197053 A1    Jul. 16, 2015

Related U.S. Application Data

(60) Provisional application No. 61/926,058, filed on Jan. 10, 2014.

(51) Int. Cl.
| | | |
|---|---|---|
| *B29C 45/76* | (2006.01) | |
| *B29C 45/00* | (2006.01) | |
| *B29C 33/38* | (2006.01) | |

(52) U.S. Cl.
CPC ....... *B29C 45/7693* (2013.01); *B29C 33/3835* (2013.01); *B29C 45/0025* (2013.01); *B29C 2945/76103* (2013.01); *B29C 2945/76588* (2013.01)

(58) Field of Classification Search
CPC .............. B29C 2045/2697; B29C 33/3835; B29C 45/7693
See application file for complete search history.

(56) References Cited

U.S. PATENT DOCUMENTS

| | | | |
|---|---|---|---|
| 4,113,829 A | 9/1978 | Bowker et al. | |
| 4,201,360 A | 5/1980 | Schwartzburg et al. | |
| 4,777,004 A | 10/1988 | Galer | |

(Continued)

FOREIGN PATENT DOCUMENTS

| | | |
|---|---|---|
| JP | 63-253811 | 10/1988 |
| JP | 07-009522 | 1/1995 |

(Continued)

OTHER PUBLICATIONS

International Search Report and Written Opinion dated Apr. 27, 2015 from related PCT Serial No. PCT/US2015/010707, 8 pages.

*Primary Examiner* — Jill Heitbrink
(74) *Attorney, Agent, or Firm* — Young Law Firm, P.C.

(57) ABSTRACT

A method may comprise generating a first electronic model of a workpiece to be manufactured using an injection-molding process. The first electronic model may then be analyzed and the workpiece in the first electronic model may then be selectively distorted according to the analysis. A second electronic model of the distorted workpiece may then be generated. The workpiece may then be injection-molded within a mold generated using the second electronic model. Thereafter, the workpiece may be cooled such that the injection-molded workpiece gradually assumes the shape or substantially the shape of the workpiece in the first electronic model.

17 Claims, 5 Drawing Sheets

(56) References Cited

U.S. PATENT DOCUMENTS

| | | | |
|---|---|---|---|
| 4,873,043 A | 10/1989 | Meyers | |
| 5,281,385 A | 1/1994 | Julian | |
| 5,435,818 A * | 7/1995 | Mashige | C03B 11/08 264/1.32 |
| 5,552,995 A * | 9/1996 | Sebastian | B29C 33/3835 700/182 |
| 5,639,416 A | 6/1997 | Pennisi et al. | |
| 5,811,133 A * | 9/1998 | Saito | B29C 45/7693 264/40.4 |
| 5,968,564 A | 10/1999 | Welsh et al. | |
| 6,304,794 B1 | 10/2001 | Nishimine | |
| 6,618,643 B2 * | 9/2003 | Nishiyama | G05B 19/4099 264/328.1 |
| 6,766,207 B2 * | 7/2004 | Sato | G06T 19/20 700/118 |
| 7,378,046 B2 | 5/2008 | Canty et al. | |
| 7,701,705 B1 | 4/2010 | Szeremeta | |
| 7,894,931 B2 * | 2/2011 | Arai | B29C 45/76 264/328.12 |
| 8,012,398 B2 | 9/2011 | Zadesky et al. | |
| 8,064,194 B2 | 11/2011 | Szeremeta | |
| 8,113,873 B1 | 2/2012 | Sarraf | |
| 8,133,426 B1 | 3/2012 | Yurchenco et al. | |
| 8,358,395 B1 | 1/2013 | Szeremeta | |
| 8,417,979 B2 | 4/2013 | Maroney | |
| 8,462,460 B1 | 6/2013 | Szeremeta et al. | |
| 8,498,088 B1 | 7/2013 | Klein | |
| 8,547,658 B1 | 10/2013 | Szeremeta | |
| 9,056,421 B2 * | 6/2015 | Bergmann | B29C 67/00 |

FOREIGN PATENT DOCUMENTS

| | | |
|---|---|---|
| JP | 08-309842 | 11/1996 |
| JP | 2001-269962 | 10/2001 |
| JP | 2003-175538 | 6/2003 |

* cited by examiner

DRAFT ANGLE (DEGREES)

| | | 1/8 | 1/4 | 1/2 | 1 | 2 | 3 | 4 | 5 |
|---|---|---|---|---|---|---|---|---|---|
| DRAW DEPTH (INCHES) | 1 | 0.002 | 0.004 | 0.009 | 0.017 | 0.035 | 0.052 | 0.070 | 0.087 |
| | 2 | 0.004 | 0.009 | 0.017 | 0.035 | 0.070 | 0.105 | 0.140 | 0.175 |
| | 3 | 0.007 | 0.013 | 0.026 | 0.053 | 0.105 | 0.157 | 0.210 | 0.263 |
| | 4 | 0.009 | 0.018 | 0.035 | 0.070 | 0.140 | 0.210 | 0.280 | 0.350 |
| | 5 | 0.011 | 0.022 | 0.044 | 0.087 | 0.175 | 0.262 | 0.350 | 0.437 |
| | 6 | 0.013 | 0.026 | 0.052 | 0.105 | 0.209 | 0.314 | 0.420 | 0.525 |
| | 7 | 0.015 | 0.031 | 0.061 | 0.123 | 0.244 | 0.367 | 0.490 | 0.612 |
| | 8 | 0.018 | 0.035 | 0.070 | 0.140 | 0.279 | 0.419 | 0.559 | 0.700 |
| | 9 | 0.020 | 0.040 | 0.078 | 0.158 | 0.314 | 0.472 | 0.629 | 0.787 |
| | 10 | 0.022 | 0.044 | 0.087 | 0.175 | 0.379 | 0.524 | 0.669 | 0.875 |

INJECTION MOLDING PART WITH "ZERO DRAFT" DESIGN AND MANUFACTURING METHODOLOGIES

CROSS-REFERENCE TO RELATED APPLICATIONS

This application claims benefit of U.S. Provisional Patent Application Ser. No. 61/926,058 entitled "INJECTION MOLDING PART WITH "ZERO DRAFT" DESIGN AND MANUFACTURING METHODOLOGIES" filed Jan. 10, 2014, the disclosure of which is incorporated by reference herein in its entirety.

BACKGROUND

Injection molding processes are widely used to produce low cost and relatively complex parts. One of the benefits of injection molding is its ability to produce high volumes of the same parts. However, the injection molding process requires that the design of a workpiece (part) follow very specific guidelines in order to achieve defect free manufacturability. The injection molding process imposes certain constrains on the manufacturing process such as uniform wall thickness, round corners, draft angles, and the like.

DETAILED DESCRIPTION

Production of an injection molding part having "zero degree" draft angle is feasible with a multi-part (e.g., split) mold design. However, a part produced by such a split mold design will usually bear witness lines that are generally undesirable from a cosmetic point of view.

Figure 1:
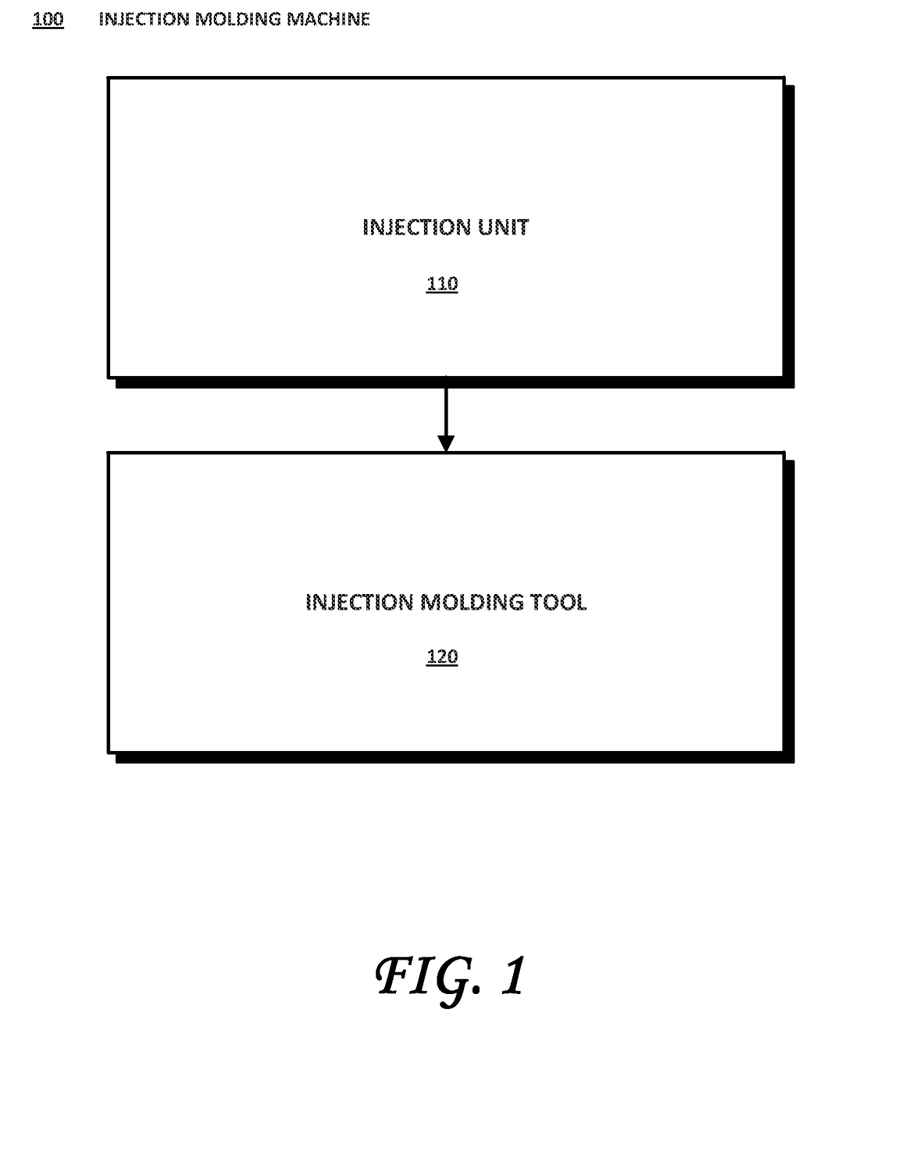
FIG. 1 is a block diagram illustration of an injection molding machine.

FIG. 1 is a block diagram illustration of an injection molding machine having an injection molding tool. As shown, an injection molding machine 100 may comprise an injection unit 110 operatively coupled with an injection molding tool 120. In an injection molding process, the injection unit 110 delivers raw material (e.g., a polymer) to the injection molding tool 120 that contains a mold. The raw material is melted and then injected into the mold by the injection molding machine 100. In some embodiments, the injection molding tool 120 fits into a standardized receptor of an injection molding machine 100. In this manner, multiple parts of various sizes and shapes can be molded using one molding machine 100 simply by exchanging different injection molding tools 120.

The injection unit 110 may be responsible for both heating and injecting the raw material into the mold. The injection unit 110 may include a container in which the raw material is stored and from which material is fed into a barrel. The barrel contains a mechanism (e.g., ram injector, reciprocating screw, etc.) for heating and injecting the material into the mold. The raw material is injected through mold channels within the injection molding tool 120 into the mold contained therein. The molten raw material that has been injected inside the mold then starts to cool as it makes contact with the surface of the mold components (i.e., the core and the cavity). As the raw material cools, it solidifies, hopefully into the shape of the desired workpiece. It should be noted that the injection unit 110 may have other components and some of the above-noted components may be provided in other units of the injection molding machine 100.

Figure 2:
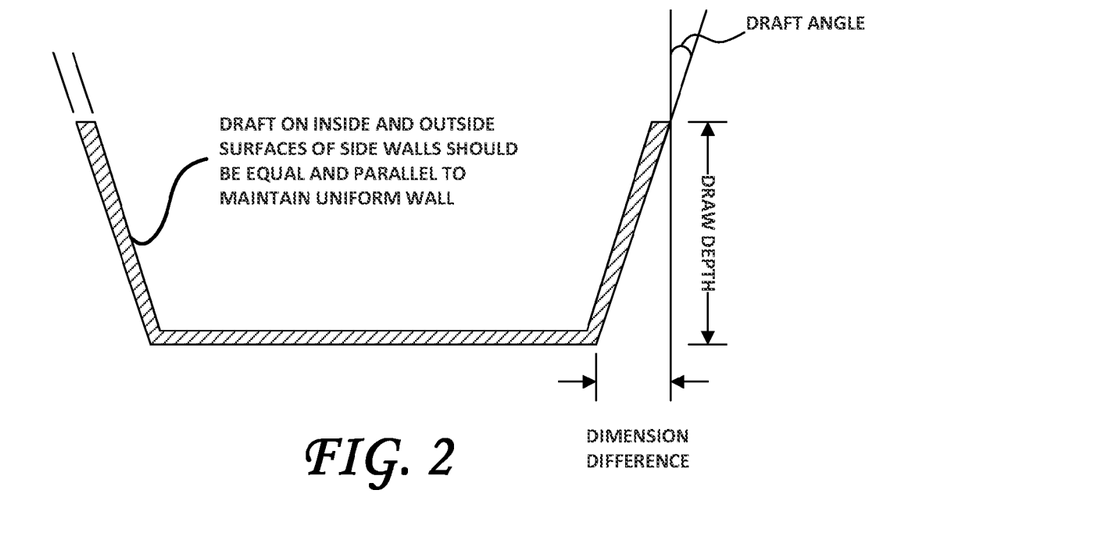
FIG. 2 is an illustration showing the relationship between draw depth and draft angle of an exemplary workpiece.

During and after the injection molding process, plastic materials shrink as they cool. As they cool, the plastic material tends to grip the core (the male tool, the cavity being the female tool) of the mold very tightly, often rendering it difficult or impossible to eject the molded workpiece from the mold. To properly release an injection-molded part from the molding tool, plastic parts are most often designed with a taper in the direction of mold movement. This taper is commonly referred as "draft" on engineering drawings of an injection molded part. FIG. 2 shows the effect of draft angle on part geometry. As indicated, the draft on inside and outside surfaces of side walls of a workpiece should be equal and parallel to maintain wall uniformity (assuming, of course, that wall uniformity is desired). In this example, the draft angle is representative of the difference between the orientation side walls of the core and cavity of the mold and the designed-for angle of the sidewalls of the resultant injection-molded workpiece. In FIG. 2, the sidewalls have been provided with a non-zero draft angle to facilitate ejection of the workpiece from the mold.

Figure 3:
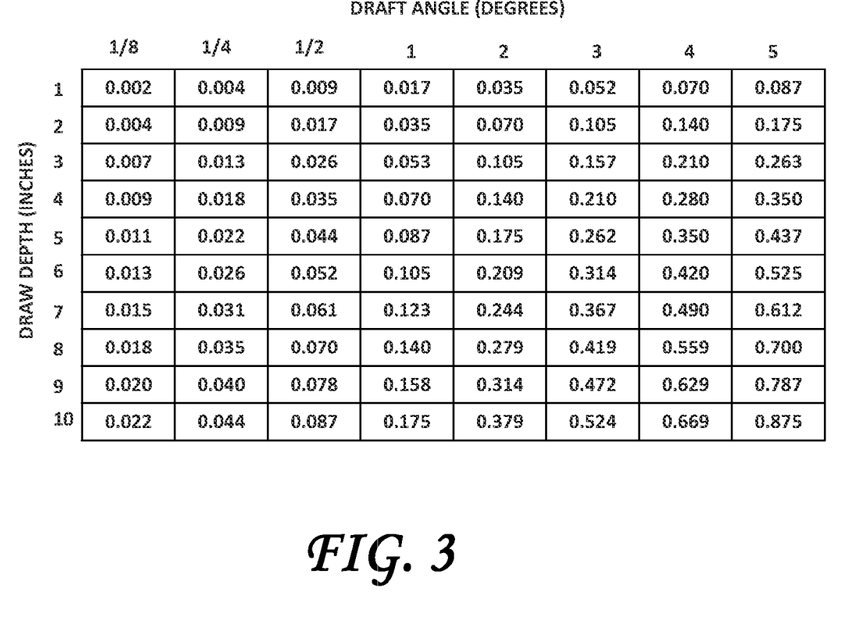
FIG. 3 is a table showing part geometry changes versus draft angles and draw depths.

In general, a draft of ½ degrees per side is recommended as minimum with 1.5 degrees to 3.5 degrees per side being frequently recommended. FIG. 3 is a table showing examples of recommended draft angles relative to draw depth. Implementing the draft angle in the mold changes the geometry of the injection-molded workpiece by introduction of the "taper effect". Indeed, the draft angle changes the geometry of the part, as the drafted workpiece differs from the designed workpiece. This is especially amplified when the mold draw depth (travel distance) is very long. Conventionally, a given draft angle is built into the mold based upon the dimensions of the workpiece. The workpiece is then iteratively cooled at different temperature differentials between the core and cavity to achieve the desired final workpiece configuration that is hopefully close to its designed-for target configuration. Often, differences between the designed-for target configuration and the configuration of the actual manufactured workpiece are accounted for through slight modifications of mating parts.

One way to mold a part with a "zero draft" mold is to provide a mold having split cavity. However, the split cavity mold design is usually more complex and the injection molded part will always bear the aforementioned visible witness lines that reflect the location of the mold split lines. From a cosmetic point of view, it is desired to produce injection-molded workpieces (parts, components) having a "clean" external surface that do not bear such witness lines.

Figure 4:
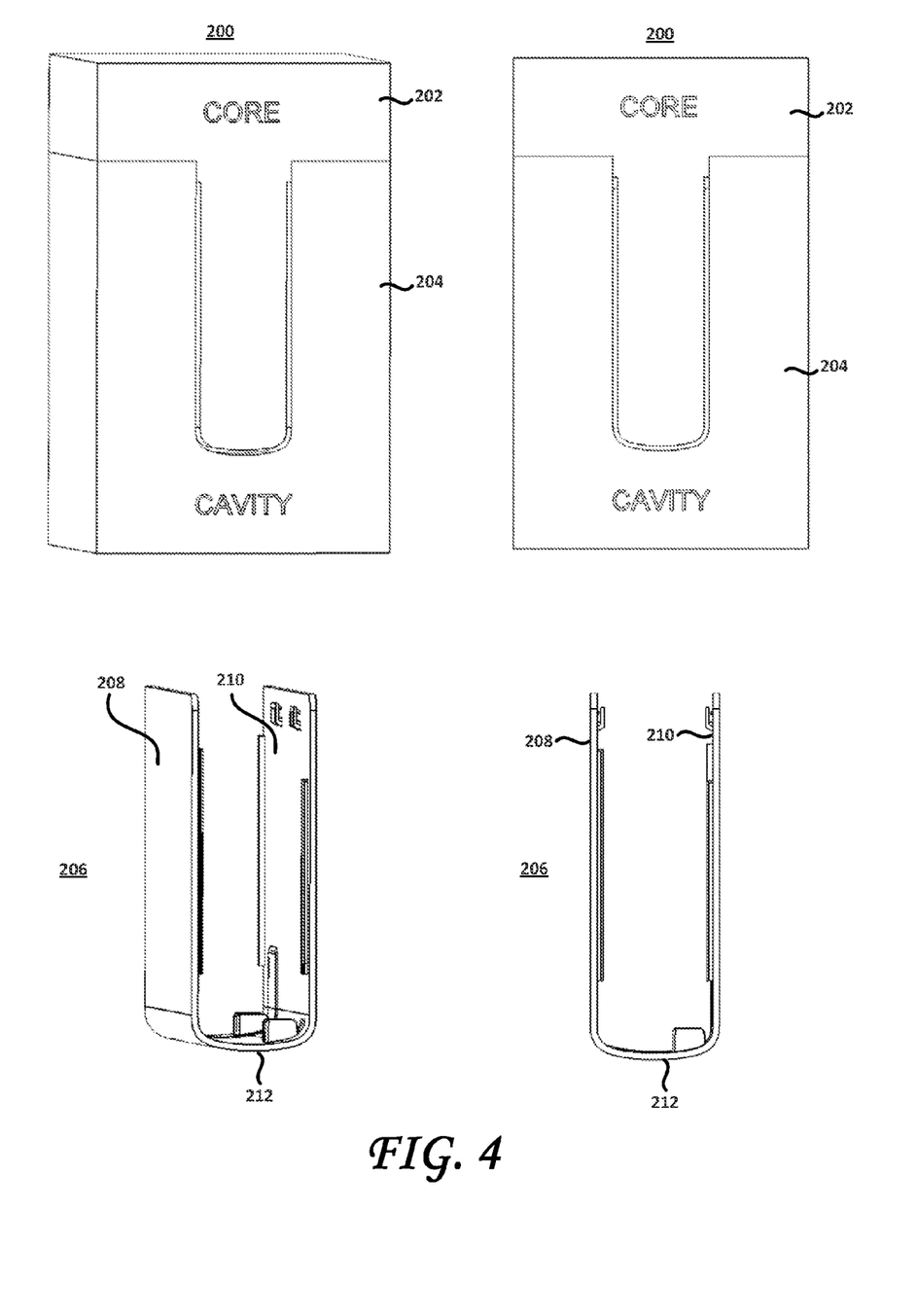
FIG. 4 is a diagram showing perspective and front views of an exemplary mold with zero draft angle and a workpiece having the designed-for, target configuration.

Embodiments of an injection molding process and apparatus are described herein with reference to figures. However, particular embodiments may be practiced without one or more of these specific details, or in combination with other known methods, materials, and apparatuses. In the following description, numerous specific details are set forth, such as specific materials, dimensions, processes parameters, etc. to provide a thorough understanding. In other instances, well-known manufacturing processes and equipment have not been described in particular detail to avoid unnecessarily obscuring the claimed subject matter. Reference throughout this specification to "an embodiment", "one embodiment" or "some embodiments" means that a particular feature, structure, material, or characteristic described in connection with the embodiment is included in at least one embodiment of the invention. Thus, the appearances of the phrase "in one embodiment" in various places throughout this specification are not necessarily referring to the same embodiment. Furthermore, the particular features, structures, materials, or characteristics may be combined in any suitable manner in one or more embodiments FIG. 4 is a diagram showing perspective and front views of an exemplary mold without draft angles and a workpiece design goal without draft angles. In FIG. 4, the mold 200 is shown with zero draft which, ignoring the effects of differential cooling and potential difficulties extracting the workpiece from the mold, would generate the workpiece 206, which is a physical incarnation of the design goal for the workpiece. In the real world, however, the effects of cooling on the injection-molded material of the workpiece cannot be ignored. Indeed, after the polymer or other material is injected into the mold 200, differences in the temperature settings between the core 202 of the mold 200 and the cavity 204 thereof create different cooling rates that result in differential shrinkage, warping and/or geometry changes throughout the thickness of the workpiece. The hotter surfaces of the workpiece will shrink more than the comparatively cooler surfaces thereof as the workpiece is cooled and/or is ejected from the mold 200. For example, depending upon the stiffness of the workpiece, differential shrinkage may occur between the external and internal surfaces 208, 210 of the workpiece. Such differential shrinkage may build up internal stresses which, in turn, could cause an undesirable warping of the workpiece 206. Such differential cooling may not only cause the sidewalls of the workpiece to undesirably bend towards one another, but the actual shape of the curved portion 212 of the workpiece will also undesirably warp or otherwise change to a shape that significantly differs from the intended and designed-for shape thereof. Such a part or workpiece may not work as designed and/or mate well with other parts.

Figure 5:
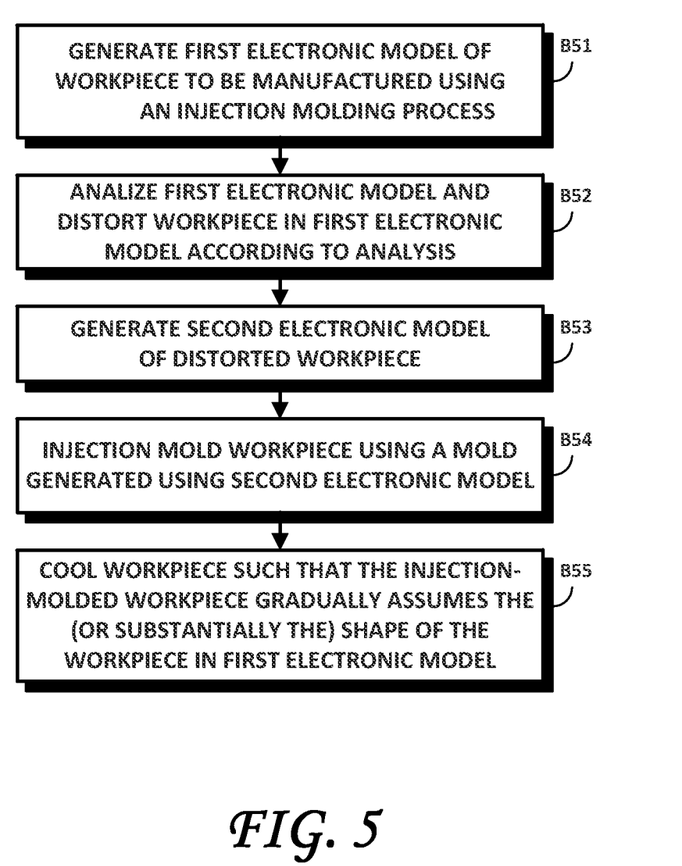
FIG. 5 is a flowchart illustrating aspects of a method according to one embodiment.

FIG. 5 is a flowchart illustrating aspects of a method according to one embodiment. It is to be noted that some of the functionality detailed in blocks B51-B55 may be omitted or combined with the other ones of the blocks B51-B55 and/or combined with other functional blocks not shown herein. As shown, block B51 calls for generating a first electronic model of the workpiece to be manufactured using an injection molding process. For example, the first electronic model may be a three-dimensional (3D) surface Computer Aided Design (CAD) file of the workpiece to be injection-molded. A fully-featured 3D functional CAD model may then be generated from the 3D surface CAD file generated in block B51. A supplier or other entity may then perform a Design for Manufacturability (DFM) review to determine whether the modelled workpiece may, in fact, be manufactured through an injection-molding process and may determine appropriate draft angle(s) to ease ejection of the workpiece from the mold, among other concerns. One or more of the suggestions or directives from the DFM review may then be implemented and a final 3D CAD model with zero draft and detailed drawings may be generated. At this stage, neither the draft angle nor any modifications to the design goal workpiece geometry have been implemented or taken into account. The detailed drawings generated at this stage may correspond, for example, to the zero-draft, designed-for target configuration shown at 206 in FIG. 4. Significantly, shrinkage, warpage and thermally-induced geometry deformations have not been taken into account, and the workpiece depicted in the detailed CAD drawings represents the desired end product; namely, the workpiece in its final, designed-for, ideal form.

Thereafter, as shown in block B52, the first electronic model may be analyzed and the workpiece in the first electronic model may be distorted according to that analysis. This analysis may comprise predicting the deformation of the injection-molded workpiece while cooling the mold may be configured to account for the predicted deformation of the injection-molded workpiece during cooling. According to one embodiment, for example, such analysis may comprise calculating internal stresses due to differential shrinkage between external and internal surfaces of the workpiece in the first model. For example and according to one embodiment, a Finite Element Analysis (FEA) may be carried out. Such a stress and displacement analysis takes the injection molding material into account, the shape and thickness of the walls or other features of the workpiece, and the rate of cooling of the workpiece after it has been ejected from the mold. A second electronic model of the distorted workpiece may then be generated, as shown at B53. According to one embodiment, the draft angle may be determined at this stage, not only to ease ejection of the workpiece from the mold, but also to predict the distortion and the warpage of the workpiece based upon the FEA. This second electronic model, based at least in part upon the FEA and the predicted distortion of the workpiece in the first model, may model and simulate the amount of deformation (strain) caused by tensile/compressive loading (stress, or pressure) of the workpiece as it cools and assumes its final shape. Parameters such as the geometry of all or one or more portions of the workpiece, the temperatures of the mold cavity and core and the temperature differential between these may be adjusted in this second electronic model such that the simulation generates a workpiece shape that will cause the cooled and/or ejected injection-molded workpiece to assume its designed-for, target, zero-draft configuration. The composition of the material, for example, may also be altered, to reduce warping as the workpiece cools. The generated second electronic model (comprising the mold having a non-zero draft and/or altered or distorted geometry (e.g., splines)) may then be adjusted as needed. The second electronic model may then be sent to a supplier for the construction of the mold (i.e., both the cavity and the core) that will produce the distorted workpiece. This mold may incorporate the draft angle and any changes in the configuration and/or geometry of the workpiece that will enable the ejected workpiece molded therein to cool and warp, shrink and/or deform to its intended, designed-for target configuration or a configuration that is acceptably close thereto. As shown at B54, the supplier or other party may then use the mold generated using the second electronic model in an injection molding process to generate a distorted workpiece that, when cooled at a predetermined temperature differential, will assume its designed-for, target shape or substantially and acceptably close thereto. The injection-molded workpiece may then be cooled, as shown at B55, such that it assumes the designed-for or target requirements or acceptably close thereto.

Figure 6:
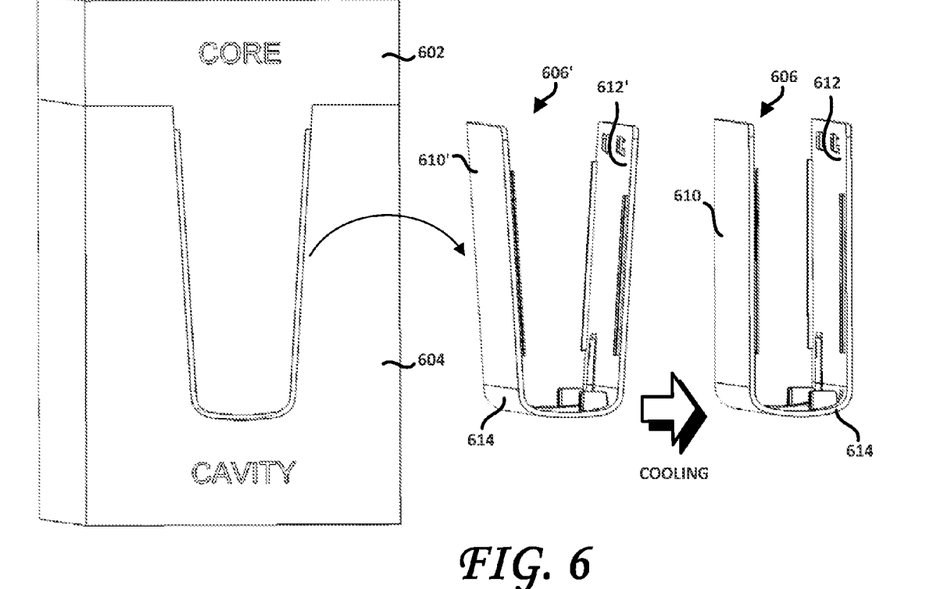
FIG. 6 is a diagram showing perspective and front views of an exemplary mold with non-zero draft angle and modified geometry and a workpiece having a substantially zero draft angle and the target geometry, obtained after cooling and/or ejecting the workpiece, according to one embodiment.

FIG. 6 is a diagram showing perspective and front views of an exemplary mold with non-zero draft angle and modified geometry and a workpiece with substantially zero draft angle and target geometry obtained after cooling of the ejected workpiece, according to one embodiment. As shown therein, the mold's core 602 and cavity 604 may be designed, using FEA and/or other software for example, with non-zero draft angle(s) and/or distorted or otherwise modified geometry such that the molded workpiece 606', after cooling, assumes its target shape or configuration, as shown at 606. The molded workpiece may have a non-zero draft angle, as shown by the angled sides thereof, and the non-parallel outer surface 610' and the inner surface 612' of the sides of the molded workpiece. As shown, the FEA was conducted such that the resulting mold 602, 604, produces a workpiece that is initially distorted from its target shape or configuration but that, after cooling and/or ejection from the mold, assumes its target shape or a shape that is within designed tolerances, as shown at 606. In assuming its target shape or configuration as shown at 606, the workpiece may contract in such a manner as its sides, in the example shown in FIG. 6, assume a parallel configuration, which is the target, or desired shape for the workpiece. In its final configuration, the outer surface 610 of the sides of the workpiece may be parallel (or acceptably close to parallel) to the inner surfaces 612 thereof. This may require, for example, that the curved portions 614 at the base of the sides be molded to have a first shape, spline or radius of curvature that is different from a target second shape, spline or radius of curvature thereof such that the first shape, spline or radius of curvature becomes the target second shape, spline or radius of curvature upon cooling and/or ejection from the mold.

According to one embodiment, at least a portion of the cooling process may be carried out within the mold 602, 604. Indeed, the core 602 of the mold may be controlled to be at a first temperature T1 and the cavity 604 of the mold may be configured to be at a second temperature T2 that is different from the first temperature T1. The temperature differential (T2−T1) may be controlled to achieve the desired cooling-induced shrinkage, warpage or geometry transformation, such that the end result is a workpiece having the designed, designed-for shape (prior to and/or after ejection of the workpiece from the mold). For example, the temperature T1 of the core 602 may be set at an exemplary 85 degrees Centigrade, whereas the temperature T2 of the cavity 604 may be set at an exemplary 60 degrees Centigrade, for a differential of 25 degrees Centigrade. In this example, this temperature differential is sufficient to bring the molded workpiece from its initial, just-molded distorted configuration to its final, target configuration after cooling. Other temperatures and differentials may be selected as needed.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

The invention claimed is:

1. A mold for manufacturing a workpiece through an injection-molding process, the mold being configured by:
generating a first electronic model of the workpiece to be manufactured;
analyzing the first electronic model;
distorting the workpiece in the first electronic model according to the analysis;
generating a second electronic model of the distorted workpiece, the second electronic model being configured with a non-zero draft angle; and
generating the mold using the second electronic model, the generated mold comprising the non-zero draft angle and a spline surface that is different than a corresponding spline surface on a cooled injection-molded workpiece generated using the generated mold, such that the generated mold is configured to mold the workpiece to be injection-molded in an initially distorted form and such that the initially-distorted injection-molded workpiece, as it cools outside of the generated mold, gradually assumes substantially the shape of the workpiece in the first electronic model.

2. The mold of claim 1, wherein analyzing comprises calculating internal stresses due to differential shrinkage between external and internal surfaces of the workpiece in the first electronic model.

3. The mold of claim 1, wherein analyzing comprises performing a Finite Element Analysis (FEA) on the first electronic model of the workpiece.

4. The mold of claim 1, wherein the mold is further configured such that the initially-distorted injection-molded workpiece gradually assumes a substantially zero-draft configuration during cooling.

5. The mold of claim 1, wherein analyzing comprises predicting a deformation of the injection-molded workpiece during cooling, and wherein the mold is configured to account for the predicted deformation of the injection-molded workpiece during cooling.

6. The mold of claim 1, wherein the mold comprises a core and a cavity configured to mate with the core, and wherein a temperature differential is maintained between the core and the cavity of the mold while the workpiece cools.

7. The mold of claim 1, wherein the mold is further configured to produce the injection-molded workpiece devoid of witness lines.

8. The mold of claim 1, wherein at least the second electronic model is generated using computer-aided design (CAD) software.

9. A method of manufacturing a workpiece through an injection-molding process, the method comprising:
generating a first electronic model of the workpiece to be manufactured;
analyzing the first electronic model;

distorting the workpiece in the first electronic model according to the analysis;

generating a second electronic model of the distorted workpiece, the second electronic model being configured with a non-zero draft angle;

generating a mold using the second electronic model, the generated mold comprising the non-zero draft angle and a spline surface that is different than a corresponding spline surface on a cooled injection-molded workpiece generated using the generated mold, such that the generated mold is configured to mold the workpiece to be injection-molded in an initially distorted form;

injection molding the workpiece in the initially distorted form in the generated mold;

cooling the initially-distorted injection-molded workpiece within the generated mold; and ejecting the initially-distorted injection-molded workpiece from the generated mold such that the ejected workpiece, as it continues to cool outside of the mold, gradually assumes substantially the shape of the workpiece in the first electronic model.

10. The method of claim 9, wherein analyzing comprises calculating internal stresses due to differential shrinkage between external and internal surfaces of the workpiece in the first electronic model.

11. The method of claim 9, wherein analyzing comprises performing a Finite Element Analysis (FEA) on the first electronic model of the workpiece.

12. The method of claim 9, wherein generating the mold further comprises configuring the mold such that the initially-distorted injection-molded workpiece gradually assumes a substantially zero-draft configuration during cooling.

13. The method of claim 9, wherein analyzing comprises predicting a deformation of the injection-molded workpiece during cooling, and wherein generating the mold further comprises configuring the mold to account for the predicted deformation of the injection-molded workpiece during cooling.

14. The method of claim 9, wherein generating the mold further comprises configuring the mold to comprise a core and a cavity configured to mate with the core.

15. The method of claim 14, wherein cooling the initially-distorted injection-molded workpiece within the mold comprises maintaining a temperature differential between the core and the cavity.

16. The method of claim 9, wherein generating the mold further comprises configuring the mold such that the workpiece that is injection-molded within the mold is devoid of witness lines.

17. The method of claim 9, wherein generating a second electronic model comprises generating the second electronic model using computer-aided design (CAD) software.

* * * * *